United States Patent [19]

Andersson et al.

[11] Patent Number: 4,682,899

[45] Date of Patent: Jul. 28, 1987

[54] FEED BEAM FOR A ROCK DRILL

[75] Inventors: Lars G. R. Andersson, Örebro; Stefan H. G. Schörling, Arboga, both of Sweden

[73] Assignee: Atlas Copco Aktiebolag, Nacka, Sweden

[21] Appl. No.: 865,935

[22] Filed: May 16, 1986

Related U.S. Application Data

[63] Continuation of Ser. No. 728,594, Apr. 29, 1985, abandoned.

[30] Foreign Application Priority Data

Apr. 27, 1984 [SE] Sweden ............................ 8402315

[51] Int. Cl.⁴ .............................................. F16C 29/02
[52] U.S. Cl. ......................................... 384/41; 384/42
[58] Field of Search ..................... 384/41, 42, 37, 26

[56] References Cited

U.S. PATENT DOCUMENTS

| | | | |
|---|---|---|---|
| 2,828,109 | 3/1958 | Dellner | 308/3.9 |
| 4,114,945 | 9/1978 | Lutz | 308/3 R |
| 4,253,709 | 3/1981 | Teramachi | 308/3 A |
| 4,516,811 | 5/1985 | Akiyama et al. | 308/3 R |

Primary Examiner—Lenard A. Footland
Attorney, Agent, or Firm—Frishauf, Holtz, Goodman & Woodward

[57] ABSTRACT

A feed beam for a rock drill comprises a die beam (10) of aluminium, which has two beads (12, 13). Guides (20) for a cradle for a rock drill can be snapped onto the beads to embrace the beads and thereby be secured to the beads.

10 Claims, 5 Drawing Figures

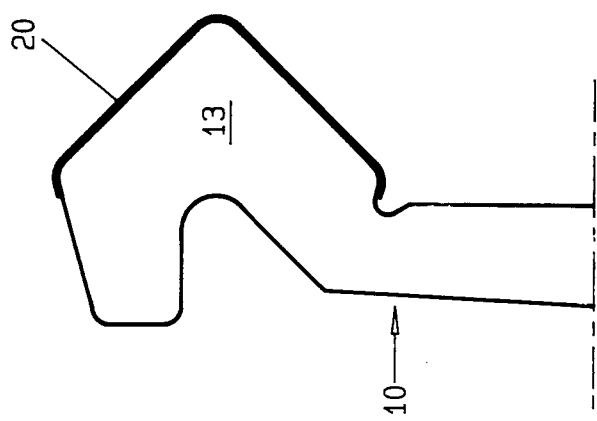
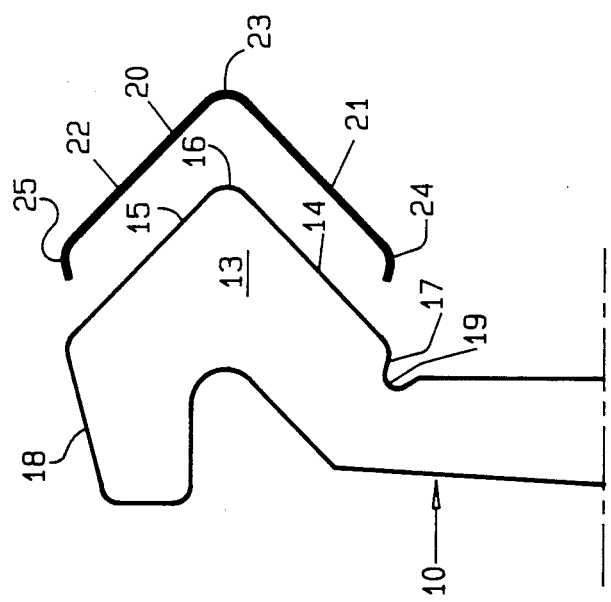

FEED BEAM FOR A ROCK DRILL

This application is a continuation of application Ser. No. 728,594, filed Apr. 29, 1985, now abandoned.

This invention relates to a feed beam for a rock drill, comprising a profiled beam of a light material, for example aluminum, on which guides made of steel for example, are mounted in order to provide guides either directly for the rock drill or for a cradle on which the rock drill can be mounted.

Such feed beams can be used for example for tunnel boring rigs and the feed beam can be mounted on a swingable boom for example as described in EP-B-4837. It is desirable that the feed beam be light and stiff. A beam of aluminum is often preferred. The guiding surfaces on such a beam have proved not to be wear resistant enough. It is known in the art to use wheels on the cradle for the rock drill in order to reduce the wear on the beam. It is also known in the art to affix flat steel guides on the aluminum beam by beams of screws.

It is an object of the invention to improve a feed beam of the kind described above.

The invention will be described with reference to the drawings.

FIG. 2 is a fragmentary end view of the feed beam shown in FIG. 1 showing a guide as it is being mounted onto the feed beam.

FIG. 3 is an end view corresponding to FIG. 2 showing the guide mounted on the beam.

Figure 5:
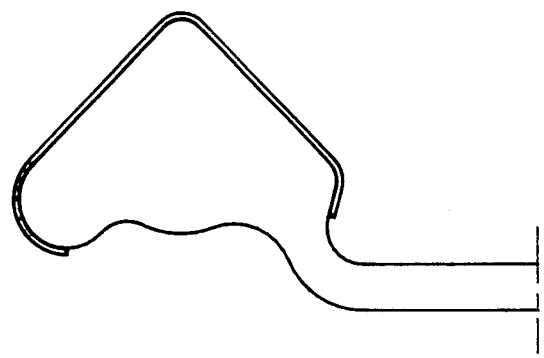
Figure 4:
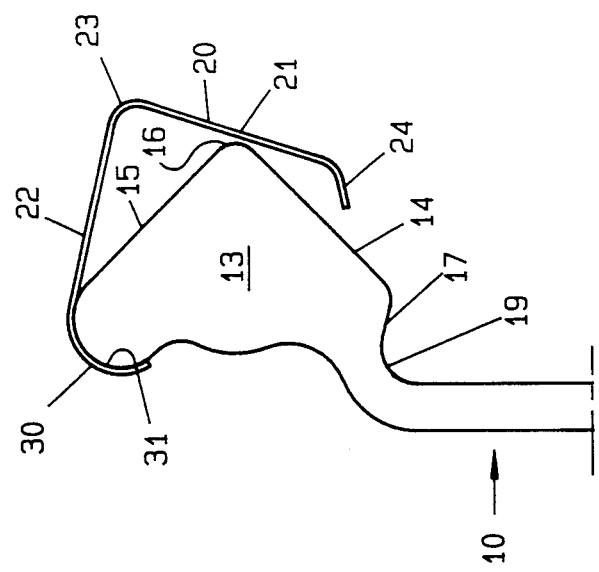

FIGS. 4 and 5 correspond to FIGS. 2 and 3 but they show another embodiment of the feed beam and the guide.

The feed beam illustrated on the drawings comprises an extruded die beam 10 of aluminum or a light metal alloy cut to a desired length, usually 3-6 m. The beam 10 has a foot plate that forms flanges 11 for mounting the beam on a support. The beam has two guide beads 12, 13, one of which, the bead 13, is shown in FIGS. 2 and 3. The bead 13 has two surfaces 14, 15 approximately at right angles to each other and there is a rounded transition 16 between the surfaces 14, 15. The upper surface 18 on the bead 13 and a corresponding surface 17 in a groove 19 form an acute angle with each other.

A guide 20 is bent of a flat sheet of spring steel and it has the same form as the bead 13 in order to fit on the latter. Thus, the guide 20 comprises two guide surfaces 21, 22 with an intermediate rounded part 23. Its ends 24, 25 are bent inwardly in order to fit on the surfaces 17, 18 and the angle between the surfaces 21, 22 of the guide 20 is somewhat smaller than the angle between the surfaces 14, 15 of the bead 13. The angles between the surfaces 17 and 18 and between the surfaces 24 and 25 are acute, that is, each guide 20 embraces the respective bead 12, 13 at an angle greater than 180°. When the guide 20 is forced onto the bead 13, it snaps on and becomes stuck because of its inherent spring characteristics. Its form will coincide with the form of the bead 13 and it will be retained by its edges. The guide 20 is stiff because of its V-form and it is secured without any screws or the like. The angle between the guiding surfaces 21, 22 need not be substantially a right angle as illustrated but it can be in the interval 60°-120°. Preferably it should be in the interval 80°-100°. The guide 20 is a wearing part and it is easy to replace. It can be replaced without the use of any tools because it is snapped in place. The beam 10 is symmetrical and a guide is to be snapped onto the bead 12 as well.

In order to prevent water and drill dust from getting under the guides 20, a sealing agent can be put onto the respective guide or head before the guide is mounted. Wax, grease, silicone or similar agents can be used. The agent can be a hardening or non-hardening agent. However, the agent should permit easy removal of the guide.

In FIGS. 4 and 5, an alternative design is shown. Parts corresponding to parts in FIGS. 1-3 have been given the same reference numerals. The edge of the guide 20 that corresponds to edge 25 in FIGS. 2 and 3 is formed as a circular hook 30 which mates with a corresponding circular surface 31 on the bead 13. When the guide 20 is to be mounted, at first the hook 30 is put on the circular surface 31. Then, the guide 20 is turned into the position of FIG. 4 around the hinge formed by the hook 30 and the circular surface 31. In the position of FIG. 4, the guide 20 is held in position by the hook 30. Then, its edge 24 can be forced onto the surface 17. The force can be applied to the central part 23 which is stiff because it is rounded. The hook 30 is bent slightly more than a right angle as is the central part 23. The edge 24 is bent less than a right angle but more than 45°. In total, the guide 20 as shown in FIGS. 4 and 5 is bent more than 270° whereas the guide 20 as shown in FIGS. 2 and 3 is bent more than 180° but less than 270°.

Figure 1:
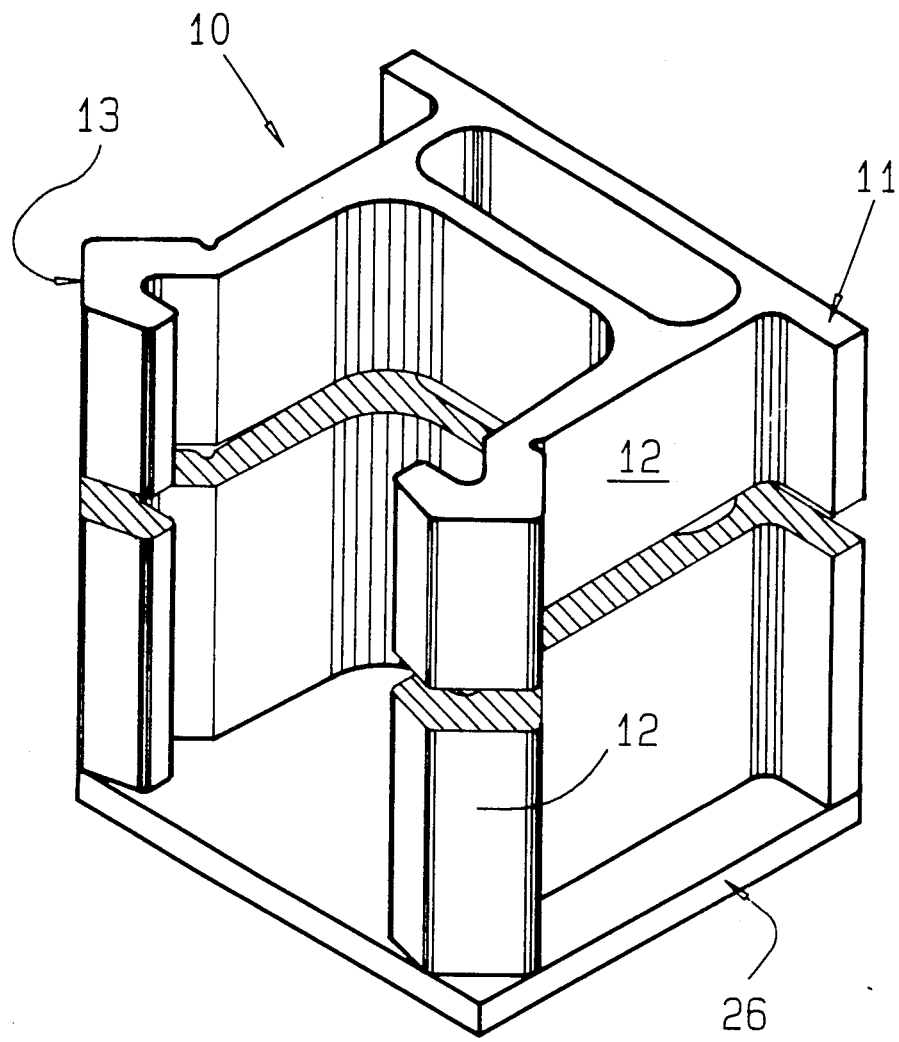
FIG. 1 is a perspective view of a feed beam according to the invention, without the guides being mounted thereon.

A complete feed beam is not illustrated on the drawings. A feeding device and a cradle for the rock drill (a rotary percussive rock drill or a rotary rock drill) is usually part of a complete feed beam. Sometimes, a cradle is not used but the rock drill can slide directly on the guides 20. The feeding device can for example comprise one or more hydraulic cylinders which, through a wire rope and pulleys can be coupled to the cradle to pull the latter in both directions along the feed beam. Heads should then be arranged on the beam 10, which carry the pulleys. If the guides 20 are of the same length as the beam 10, the end heads can simultaneously form axial supports for the guides. Such an end head 26 is schematically shown in FIG. 1. The guides will thus be axially fixed between axial supports that are fixed to the beam 10.

What is claimed is:

1. Apparatus for guiding the sliding movement of an object in contact therewith, comprising:
    an elongated beam having a transverse cross-section which includes a shaped peripheral surface bounded at its ends by retaining portions angled with respect to said peripheral surface, said shaped peripheral surface comprising two flat surfaces joined at a first angle to each other and
    a bent plate having an inner surface shaped to substantially conform to said shaped surface of the beam and bounded at its ends by edge means angled with respect to said inner surface, said shaped surface of the plate comprising two flat surfaces joined at a second angle to each other,
    said first and second angles being, respectively, between 60° and 120°,
    said edge means being suitably angled relative to said retaining portions to enable said bent plate to be snapped onto said elongated beam and for resiliently grasping said retaining portions to fixedly secure the bent plate to the beam so that the respective shaped surfaces are in contact to thereby position an outer surface of said bent plate to serve as the guide for said sliding movement.

2. The guiding apparatus of claim 1, wherein said first and second angles are, respectively, between 80° and 100°.

3. The guiding apparatus of claim 1, wherein the second angle of the plate is smaller than the first angle of the beam.

4. The guiding apparatus of claim 1, wherein the retaining portions on the beam each comprises a flat surface at a first obtuse angle to its adjacent flat surface, and said edge means on the plate each comprises a flat surface at a second obtuse angle to its adjacent flat surface.

5. The guiding apparatus of claim 1, wherein the retaining portions on the beam comprise a first rounded surface at one end of said shaped surface and a flat surface at the other end of said shaped surface at a third obtuse angle to its adjacent flat surface, and said edge means comprises a second rounded surface at one and of said shaped surface comforming substantially in shape to said first rounded surface and a flat surface at the other end of said shaped surface at a fourth obtuse angle to its adjacent flat surface.

6. The guiding apparatus of claim 5, wherein the first and second rounded surfaces are, respectively, at an angle of approximately 90° to the adjacent shaped surface.

7. The guiding apparatus of claim 6, wherein the angle between the second rounded surface and its adjacent flat surface on the plate is smaller than the corresponding angle between the first rounded surface and its adjacent flat surface on the beam.

8. The guiding apparatus of claim 1, wherein the boundary between the flat surfaces of the shaped surfaces on the beam and plate, respectively, is a rounded surface.

9. The guiding apparatus of claim 1, wherein said bent plate is made of a hard, resilient material such as steel.

10. A feed beam for guiding the sliding movement of a rock drill to be carried thereby comprising:

an elongated beam body of light metal having a transverse contour which includes a pair of opposed shaped peripheral surfaces each bounded at its ends by retaining portions angled with respect to its peripheral surfaces, and a pair of bent resilient sheet steel plates each having an inner surface shaped to substantially conform each to one of said shaped surfaces of the beam body and bounded at its ends by edge means angled with respect to said inner surface, said edge means being suitably angled relative to said retaining portions to enable said bent plates to be snapped onto said beam body for resiliently grasping said retaining portions to fixedly but removably secure the bent plates to the beam so that the respective shaped surfaces are in contact to thereby position an outer surface of said bent plate to serve as a wear resistant guide for said sliding movement.

* * * * *